US009678374B2

(12) United States Patent
Wu

(10) Patent No.: US 9,678,374 B2
(45) Date of Patent: Jun. 13, 2017

(54) ARRAY SUBSTRATE, LIQUID CRYSTAL DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Hao Wu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 14/784,911

(22) PCT Filed: Apr. 28, 2015

(86) PCT No.: PCT/CN2015/077679
§ 371 (c)(1),
(2) Date: Oct. 15, 2015

(87) PCT Pub. No.: WO2016/045382
PCT Pub. Date: Mar. 31, 2016

(65) Prior Publication Data
US 2016/0238870 A1     Aug. 18, 2016

(30) Foreign Application Priority Data
Sep. 26, 2014   (CN) .......................... 2014 1 0504887

(51) Int. Cl.
*G02F 1/136*   (2006.01)
*G02F 1/133*   (2006.01)
*G09G 3/36*   (2006.01)

(52) U.S. Cl.
CPC ........... *G02F 1/13306* (2013.01); *G09G 3/36* (2013.01); *G02F 2203/60* (2013.01); *G02F 2203/66* (2013.01); *G09G 2320/041* (2013.01)

(58) Field of Classification Search
CPC . G02F 1/136; G09G 3/3685; G09G 2320/041
See application file for complete search history.

(56) References Cited

U.S. PATENT DOCUMENTS 3,503,673 A * 3/1970 Zanoni ................ G02F 1/13306
252/299.01
3,957,349 A * 5/1976 Nelson ................... G02F 1/1354
250/331

(Continued)

FOREIGN PATENT DOCUMENTS

CN    102222485 A    10/1920
CN     1677474 A    10/2005

(Continued)

OTHER PUBLICATIONS

International Search Report and Written Opinion with English Language, dated Jul. 17, 2015, Application No. PCT/CN2015/077679.

(Continued)

*Primary Examiner* — Timothy L Rude
(74) *Attorney, Agent, or Firm* — Blakely Sokoloff Taylor & Zafman LLP

(57) ABSTRACT

The embodiments of the present invention disclose an array substrate, a liquid crystal display panel and a display device. Low temperature compensation circuits one-to-one corresponding to the data lines are added to the peripheral area of the array substrate; each low temperature compensation circuit comprises a first branch and a second branch connected in parallel; wherein the first branch comprises a divider resistance; the second branch comprises a diode and a capacitance connected in series; in the second branch the (Continued)

position of the diode and the position of the capacitance can be interchanged. Since the voltage difference between the both terminals of the diode rises with the temperature decreasing, the voltage difference on the route comprising the diode and the capacitance rises when the temperature decreases; a divider resistance is used in the route to divide the voltage of the voltage signal inputted at the data signal receiving terminal, reducing the voltage signal inputted to the input terminal of the data line. The reduced voltage signal brings a higher transmittance, compensating the integral shift of the voltage-transmittance curve in low temperature environment, such that the voltage-transmittance curve at low temperature is kept in accordance with that at normal temperature.

15 Claims, 6 Drawing Sheets

(56) References Cited

U.S. PATENT DOCUMENTS

| | | | | |
|---|---|---|---|---|
| 4,392,719 | A * | 7/1983 | Sekimoto | G02F 1/135 349/168 |
| 4,403,217 | A * | 9/1983 | Becker | G02F 1/1365 345/206 |
| 5,301,047 | A * | 4/1994 | Hoshino | G09G 3/3622 345/95 |
| 6,414,740 | B1 * | 7/2002 | Hosoyamada | G02F 1/133382 349/161 |
| 6,999,058 | B1 * | 2/2006 | Yano | G09G 3/3696 345/101 |
| 7,528,896 | B2 * | 5/2009 | Nilsson | G02F 1/1365 349/143 |
| 8,106,863 | B2 * | 1/2012 | Huang | G09G 3/3655 345/87 |
| 8,625,039 | B2 * | 1/2014 | Tajiri | G09G 3/3651 345/211 |
| 2006/0007207 | A1 | 1/2006 | Kawaguchi | |
| 2008/0198299 | A1 * | 8/2008 | Choi | G09G 3/3413 349/68 |
| 2010/0053054 | A1 | 3/2010 | Jeong et al. | |
| 2010/0277519 | A1 | 11/2010 | Lee | |
| 2015/0326115 | A1 * | 11/2015 | Chen | H02M 3/156 345/212 |

FOREIGN PATENT DOCUMENTS

| | | |
|---|---|---|
| CN | 1949356 A | 4/2007 |
| CN | 201063587 Y | 5/2008 |
| CN | 202583642 | 12/2012 |
| CN | 104280911 | 1/2015 |
| JP | H11231350 | 8/1999 |
| JP | 2000275619 | 10/2000 |
| JP | 2011141151 | 7/2011 |

OTHER PUBLICATIONS

Liu Zhongzhan. "Principle and application of Electronic Transformers." China Electric Power Press, Jun. 2014. pp. 47-51.
Wwang Rilong."Technology of Electrotechnics and Electronics." Nanjing University Press, Aug. 2014. pp. 127-129.
Xiao Jinghe. "Quick Start for Electronic Enthusiasts." China Electric Power Press, Jan. 2014. pp. 70-72.
Office Action in Chinese Application No. 201410504887.8 dated Sep. 5, 2016, with English translation. 28 pages.

* cited by examiner

ARRAY SUBSTRATE, LIQUID CRYSTAL DISPLAY PANEL AND DISPLAY DEVICE

FIELD OF THE INVENTION

The present invention relates to the technical field of display, in particular to an array substrate, a liquid crystal display panel and a display device.

BACKGROUND OF THE INVENTION

At present, liquid crystal display technology is widely used in display of TV, mobile phone and public information; the image quality is an important condition for the success of these products; among the parameters deciding the image quality, the brightness of liquid crystal display is an important parameter standard. However, as for the traditional low temperature poly silicon liquid crystal display applying liquid crystal display technology, its liquid crystal may be affected by low temperature; poor image and optical properties often occur in low temperature environment.

In general, the voltage-transmittance curve of a liquid crystal display panel at minus 20 degrees Celsius has obvious difference with that at normal temperature state of 25 degrees Celsius. As shown in FIG. 1, a voltage-transmittance curve of a liquid crystal display panel at minus 20 degrees Celsius is indicated by 1; a voltage-transmittance curve of the liquid crystal display panel at 0 degrees Celsius is indicated by 2; and a voltage-transmittance curve of the liquid crystal display panel at 25 degrees Celsius is indicated by 3. As can be seen from FIG. 1, between the voltages of 1V and 2V, when the same voltage signals are input, the transmittance of a liquid crystal display panel at minus 20 degrees Celsius is obviously lower than the transmittance of the liquid crystal display panel at 25 degrees Celsius. This will cause, under the same voltage signal due to an abrupt temperature drop, a display state in which the liquid crystal display panel will show obvious differences in the brightness, contrast, gamut and other aspects compared with those at normal temperature state, affecting the quality of the display image, making the user experience significantly lower.

Therefore, it is a problem to be solved in the art to improve the voltage-transmittance of liquid crystal display panel in low temperature environment and guarantee the quality of the display image.

SUMMARY OF THE INVENTION

The embodiments of the present invention provide an array substrate, a liquid crystal display panel and a display device, for solving the problem of the voltage-transmittance of liquid crystal display panel in low temperature environment being lower than that in normal temperature state, which exists in the prior art.

An embodiment of the present invention provides an array substrate, the array substrate comprises a display area and a peripheral area; the display area has a plurality of data lines; wherein the array substrate further comprises: low temperature compensation circuits arranged in the peripheral area and one-to-one corresponding to the data lines; each low temperature compensation circuit comprises a first branch and a second branch connected in parallel; wherein the first branch comprises a divider resistance;

the second branch comprises a diode and a capacitance connected in series;

wherein an anode terminal of the diode is connected with an input terminal of a data line, a cathode terminal of the diode is connected with a terminal of the capacitance, another terminal of the capacitance is connected with a data signal receiving terminal; or, a cathode terminal of the diode is connected with a data signal receiving terminal, an anode terminal of the diode is connected with a terminal of the capacitance, another terminal of the capacitance is connected with an input terminal of a data line.

In a possible implementation, in the array substrate provided by the embodiment of the present invention, the sum of a voltage difference between the both terminals of the capacitance and a voltage difference between the both terminals of the diode at normal temperature is zero.

In a possible implementation, in the array substrate provided by the embodiment of the present invention, the normal temperature is 298K-300K.

In a possible implementation, in the array substrate provided by the embodiment of the present invention, the change rates with temperature of voltage differences between the both terminals of the diode in respective low temperature compensation circuits connected with respective data lines are the same.

In a possible implementation, in the array substrate provided by the embodiment of the present invention, the change rate with temperature of voltage difference between the both terminals of the diode is: $\Delta V=671.5-2.3*T$; wherein T is thermodynamic temperature scale.

When the temperature is 298K, the voltage value of the diode is −12.3 mV.

The change rate with temperature of the diode is: when the temperature is 298K, the voltage value of the diode is −12.3 mV.

In a possible implementation, in the array substrate provided by the embodiment of the present invention, a range of resistance value for the divider resistance is: $500\Omega$-$1000\Omega$.

In a possible implementation, in the array substrate provided by the embodiment of the present invention, the low temperature compensation circuit further comprises: a switching transistor connected in the second branch in series; wherein a gate of the switching transistor is connected with a control signal terminal, a source and a drain of the switching transistor are connected in the second branch in series, the control signal terminal is used for switching the switching transistor into an on state during a period of low temperature compensation.

An embodiment of the present invention provides a liquid crystal display panel, wherein the liquid crystal display panel comprises the array substrate provided by the embodiments of the present invention, the liquid crystal display panel is normal white in an initial state.

An embodiment of the present invention provides a display device, wherein the display device comprises the liquid crystal display panel provided by the embodiment of the present invention.

The advantageous effects of the present invention comprise the following aspects.

The embodiments of the present invention provide an array substrate, a liquid crystal display panel and a display device. Low temperature compensation circuits one-to-one corresponding to the data lines are added to the peripheral area of the array substrate; each low temperature compensation circuit comprises a first branch and a second branch connected in parallel; wherein the first branch comprises a divider resistance; the second branch comprises a diode and a capacitance connected in series; in the second branch the position of the diode and the position of the capacitance can be interchanged, i.e., an anode terminal of the diode is connected with an input terminal of a data line, a cathode terminal of the diode is connected with a terminal of the capacitance, another terminal of the capacitance is connected with a data signal receiving terminal; or, a cathode terminal of the diode is connected with a data signal receiving terminal, an anode terminal of the diode is connected with a terminal of the capacitance, another terminal of the capacitance is connected with an input terminal of a data line. Since a diode has such a property that the voltage difference between the both terminals of the diode rises with the temperature decreasing, the voltage difference on the route comprising the diode and the capacitance rises when the temperature decreases; therefore, a divider resistance is used in the route to divide the voltage of the voltage signal inputted at the data signal receiving terminal, reducing the voltage signal inputted to the input terminal of the data line. The reduced voltage signal brings a higher transmittance, compensating the integral shift of the voltage-transmittance curve in low temperature environment. Hence, compared with the performance in normal temperature environment, by inputting the same voltage signal, the voltage-transmittance curve of the liquid crystal display panel will have an integral shift toward the direction of increasing voltage in low temperature environment, such that the voltage-transmittance curve of the liquid crystal display panel at low temperature is kept in accordance with that at normal temperature, ensuring the quality of the display image of the liquid crystal display panel in low temperature environment being same with that in normal temperature environment, and improving the user experience.

DETAILED DESCRIPTION OF THE INVENTION

In the following, the embodiments of the array substrate, liquid crystal display panel and display device provided by the present invention will be described clearly and completely in connection with the drawings.

Figure 1:
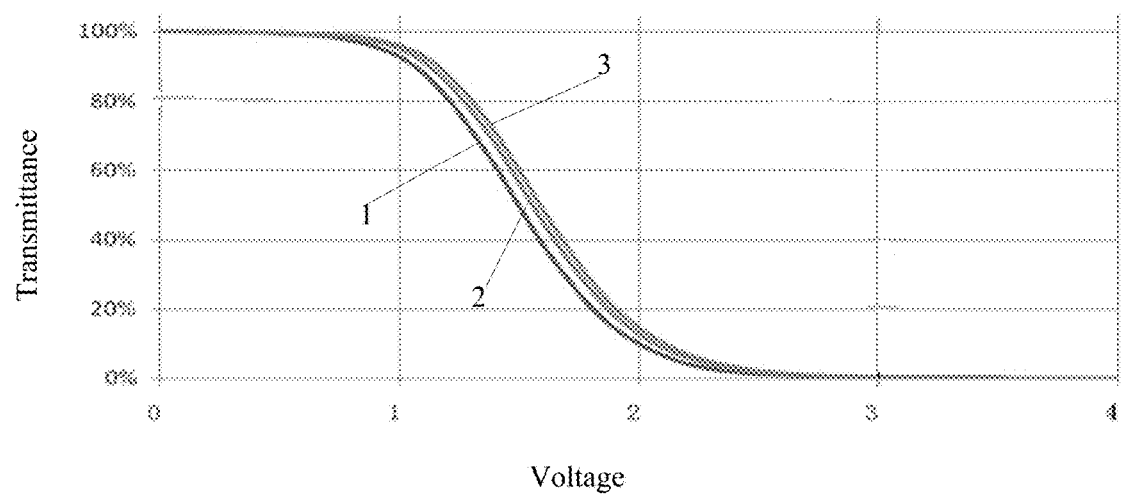
FIG. 1 is a schematic diagram showing a shift of the voltage-transmittance curve of the liquid crystal display panel in low temperature environment in the prior art.
Figure 2A:
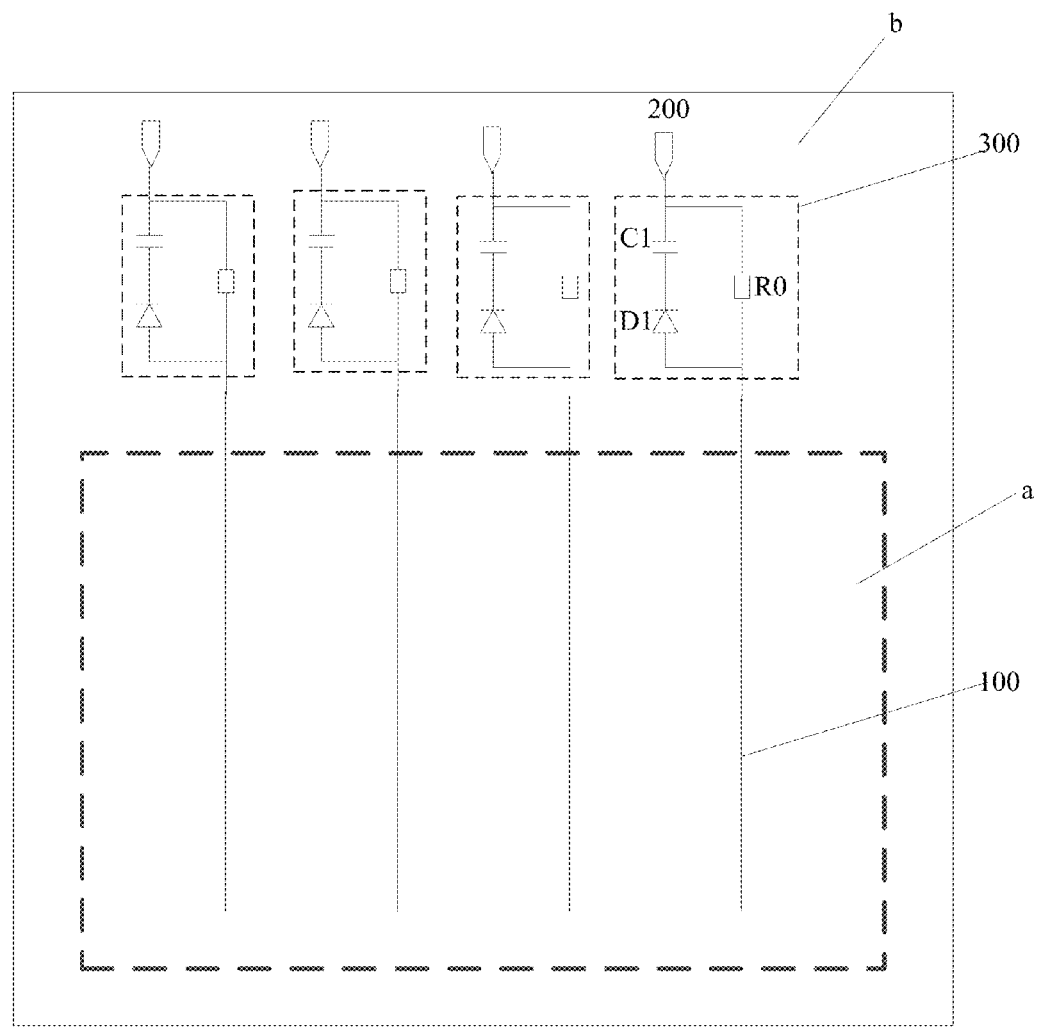
FIG. 2*a* is a first structural diagram of an array substrate provided by an embodiment of the present invention.
Figure 2B:
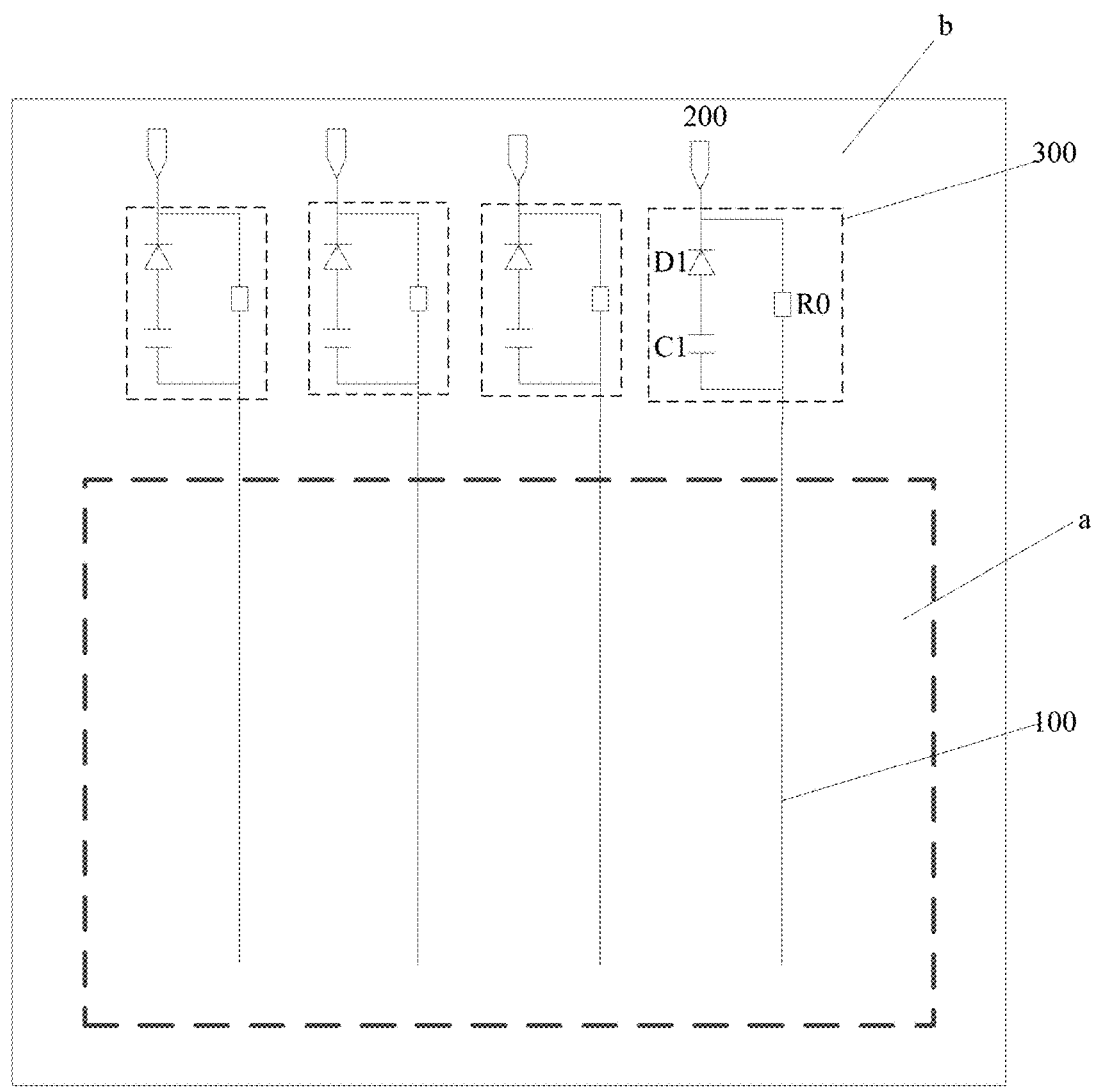
FIG. 2*b* is a second structural diagram of an array substrate provided by an embodiment of the present invention.

The embodiments of the present invention provide an array substrate, as shown in FIGS. 2*a* and 2*b*, the array substrate comprises a display area a and a peripheral area b; the display area a has a plurality of data lines 100; wherein the array substrate further comprises: low temperature compensation circuits 300 arranged in the peripheral area b and one-to-one corresponding to the data lines 100; each low temperature compensation circuit 300 comprises a first branch and a second branch connected in parallel; wherein the first branch comprises a divider resistance R0;

the second branch comprises a diode D1 and a capacitance C1 connected in series;

wherein as shown in FIG. 2*a*, an anode terminal of the diode D1 is connected with an input terminal of a data line 100, a cathode terminal of the diode D1 is connected with a terminal of the capacitance C1, another terminal of the capacitance C1 is connected with a data signal receiving terminal 200; or, as shown in FIG. 2*b*, a cathode terminal of the diode D1 is connected with a data signal receiving terminal 200, an anode terminal of the diode D1 is connected with a terminal of the capacitance C1, another terminal of the capacitance C1 is connected with an input terminal of a data line 100.

In the array substrate provided by the embodiments of the present invention, low temperature compensation circuits 300 one-to-one corresponding to the data lines 100 are added to the peripheral area b of the array substrate; each low temperature compensation circuit 300 comprises a first branch and a second branch connected in parallel; wherein the first branch comprises a divider resistance R0; the second branch comprises a diode D1 and a capacitance C1 connected in series; in the second branch the position of the diode D1 and the position of the capacitance C1 can be interchanged. As shown in FIG. 2*a*, an anode terminal of the diode D1 is connected with an input terminal of a data line 100, a cathode terminal of the diode D1 is connected with a terminal of the capacitance C1, another terminal of the capacitance C1 is connected with a data signal receiving terminal 200; or, as shown in FIG. 2*b*, a cathode terminal of the diode D1 is connected with a data signal receiving terminal 200, an anode terminal of the diode D1 is connected with a terminal of the capacitance C1, another terminal of the capacitance C1 is connected with an input terminal of a data line 100. Since the diode D1 has such a property that the voltage difference between the both terminals of the diode D1 rises with the temperature decreasing, the voltage difference on the route comprising the diode D1 and the capacitance C1 rises when the temperature decreases; therefore, a divider resistance is used in the route to divide the voltage of the voltage signal inputted at the data signal receiving terminal 200, reducing the voltage signal inputted to the input terminal of the data line 100. The reduced voltage signal brings a higher transmittance, compensating the integral shift of the voltage-transmittance curve in low temperature environment. Hence, compared with the performance in normal temperature environment, by inputting the same voltage signal, the voltage-transmittance curve of the liquid crystal display panel will have an integral shift toward the direction of increasing voltage in low temperature environment, such that the voltage-transmittance curve of the liquid crystal display panel at low temperature is kept in accordance with that at normal temperature, ensuring the quality of the display image of the liquid crystal display panel in low temperature environment being same with that in normal temperature environment, and improving the user experience.

In a specific implementation, in the array substrate provided by the embodiment of the present invention, the sum of a voltage difference between the both terminals of the capacitance and a voltage difference between the both terminals of the diode at normal temperature is zero; in such a manner, it can be realized that in normal temperature environment, the low temperature compensation circuit 300 can deliver a voltage signal inputted from the data signal receiving terminal 200 to the data line 100 directly. Therefore, in normal temperature environment, the voltage value on the route comprising the diode D1 and the capacitance C1 connected in series is zero; a voltage signal inputted from the data signal receiving terminal 200 can be delivered to the input terminal of the data line 100 directly through the route comprising the diode D1 and the capacitance C1; therefore, the voltage value on the data signal receiving terminal 200 is same with that on the input terminal of the data line 100, the liquid crystal display panel can have a normal voltage-transmittance, thereby the liquid crystal display panel can display images normally.

In a specific implementation, in the array substrate provided by the embodiment of the present invention, the normal temperature is 298K-300K, i.e., 25-27 degrees Celsius. In normal temperature environment, the voltage-transmittance curve of the liquid crystal display panel is normal; the properties such as the display brightness, contrast, gamut, etc. of the liquid crystal display panel are in normal display state, which can satisfy the user's viewing experience.

In a specific implementation, in the array substrate provided by the embodiment of the present invention, to realize display uniformity for the liquid crystal display panel, it is required that the change rates with temperature of voltage differences between the both terminals of the diode in respective low temperature compensation circuits connected with respective data lines are the same. In such a manner, all the working conditions of the low temperature compensation circuits 300 are consistent in normal temperature environment or in low temperature environment; i.e., provided with the same voltage signal, the low temperature compensation circuits 300 perform the same process for the voltage signals inputted from the data signal receiving terminal, obtaining the same voltage signals, and delivering the same voltage signals to the input terminals of the data lines.

Figure 3:
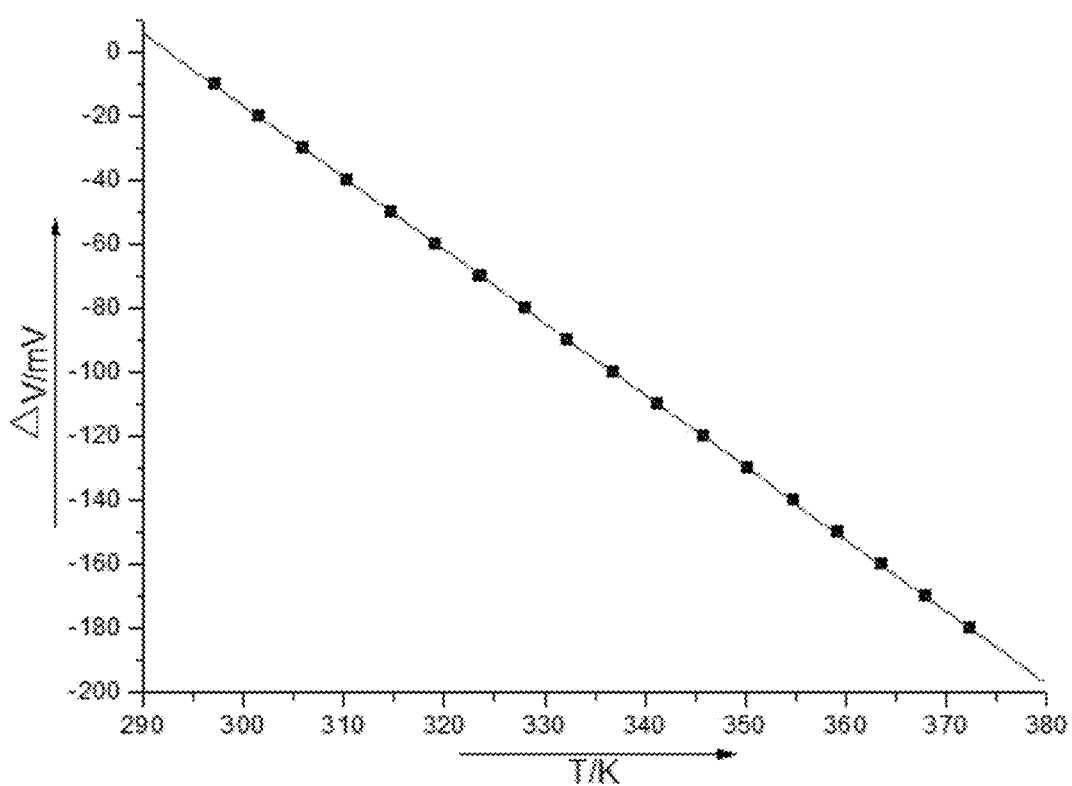
FIG. 3 is a schematic diagram showing a voltage difference between the both terminals of a diode changing with temperature provided by an embodiment of the present invention.

In a specific implementation, in the array substrate provided by the embodiment of the present invention, as shown in FIG. 3, the diode D1 has such a property that the voltage difference between the both terminals of the diode rises with the temperature decreasing; the property shows that the change rate with temperature of voltage difference between the both terminals of the diode D1 is: $\Delta V = 671.5 - 2.3 * T$; wherein T is thermodynamic temperature scale. In normal temperature environment, e.g. when the temperature is 298K, the voltage difference between the both terminals of the diode D1 is −12.3 mV; therefore, the voltage difference between the both terminals of the capacitance C1 can be set as 12.3 mV based on the variation characteristic of the diode D1. In such a manner, the sum of the voltage differences in a route comprising the capacitance C1 and the diode D1 at normal temperature is zero; this ensures that in normal temperature environment, in the low temperature compensation circuit 300, the voltage value on the data signal receiving terminal 200 is same with that on the input terminal of the data line 100, i.e., a voltage signal inputted from the data signal receiving terminal 200 can be delivered to the input terminal of the data line 100 directly through the route comprising the diode D1 and the capacitance C1; the liquid crystal display panel thus can have a normal voltage-transmittance in normal temperature environment, ensuring the liquid crystal display panel displaying images normally.

In a specific implementation, in the array substrate provided by the embodiment of the present invention, to realize that the low temperature compensation circuit 300 can perform an appropriate voltage dividing process for the voltage signal inputted from the data signal receiving terminal 200 in low temperature environment, a range of resistance value for the divider resistance R0 can be arranged as: 500Ω-1000Ω. In such a manner, in low temperature environment, the low temperature compensation circuit 300 can perform a voltage dividing process for the voltage signal inputted from the data signal receiving terminal 200; by subtracting the voltage signal on the divider resistance R0 from the voltage signal inputted from the data signal receiving terminal 200, one can obtain the voltage signal on the input terminal of the data line 100. In this situation, the voltage value on the route comprising the diode D1 and the capacitance C1 is equal to the voltage value on the divider resistance R0; therefore, with the voltage dividing process of the divider resistance R0, the voltage signal finally delivered to the input terminal of the data line 100 is reduced, the voltage-transmittance curve of the liquid crystal display panel will have an integral shift toward the direction of increasing voltage, such that the voltage-transmittance curve of the liquid crystal display panel at low temperature is kept in accordance with that at normal temperature.

Figure 4:
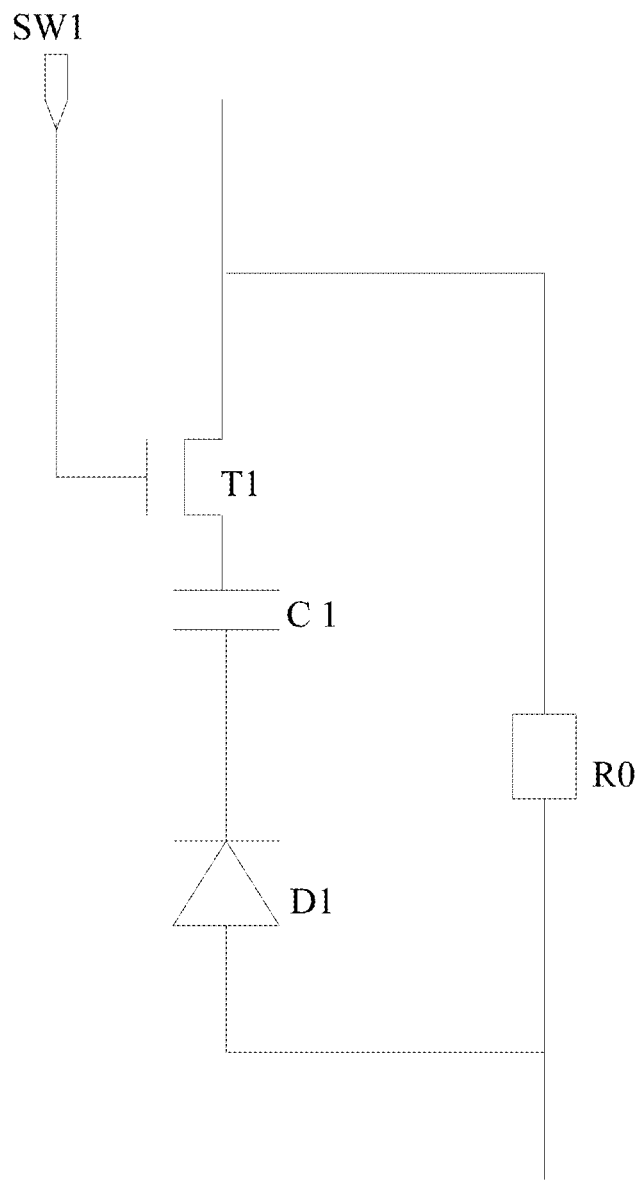
FIG. 4 is a specific structural diagram of a low temperature compensation circuit provided by an embodiment of the present invention.

In a specific implementation, in the array substrate provided by the embodiment of the present invention, as shown in FIG. 4, the low temperature compensation circuit 300 can further comprise: a switching transistor T1 connected in the second branch in series; wherein a gate of the switching transistor T1 is connected with a control signal terminal SW1, a source and a drain of the switching transistor T1 are connected in the second branch in series, the control signal terminal SW1 is used for switching the switching transistor T1 into an on state during a period of low temperature compensation; moreover, the switching transistor T1 can be an N type transistor or a P type transistor, which is not limited here. In the embodiments of the present invention, the examples are illustrated with the switching transistor T1 being an N type transistor. In such a manner, in low temperature environment, when a voltage signal is being inputted into the data signal receiving terminal 200, a switch-on signal is being inputted into the control signal terminal SW1, the switching transistor T1 is then in an on state under the control of the control signal terminal SW1. Since the diode D1 has such a property that the voltage difference between the both terminals of the diode D1 rises with the temperature decreasing, the voltage difference on the route comprising the diode D1 and the capacitance C1 rises when the temperature decreases, therefore, a voltage dividing process can be performed for the voltage signal inputted from the data signal receiving terminal 200. The processed voltage signal can then be delivered to the input terminal of the data line 100. By inputting the same voltage signal, the voltage-transmittance curve of the liquid crystal display panel will have an integral shift toward the direction of increasing voltage in low temperature environment, such that the voltage-transmittance curve of the liquid crystal display panel at low temperature is kept in accordance with that at normal temperature, ensuring the display properties of the liquid crystal display panel in low temperature environment being same with those in normal temperature environment, and improving the user experience.

Based on the same inventive concept, an embodiment of the present invention provides a liquid crystal display panel, wherein the liquid crystal display panel comprises the array substrate provided by the embodiments of the present invention, the liquid crystal display panel is normal white in an initial state.

Figure 5:
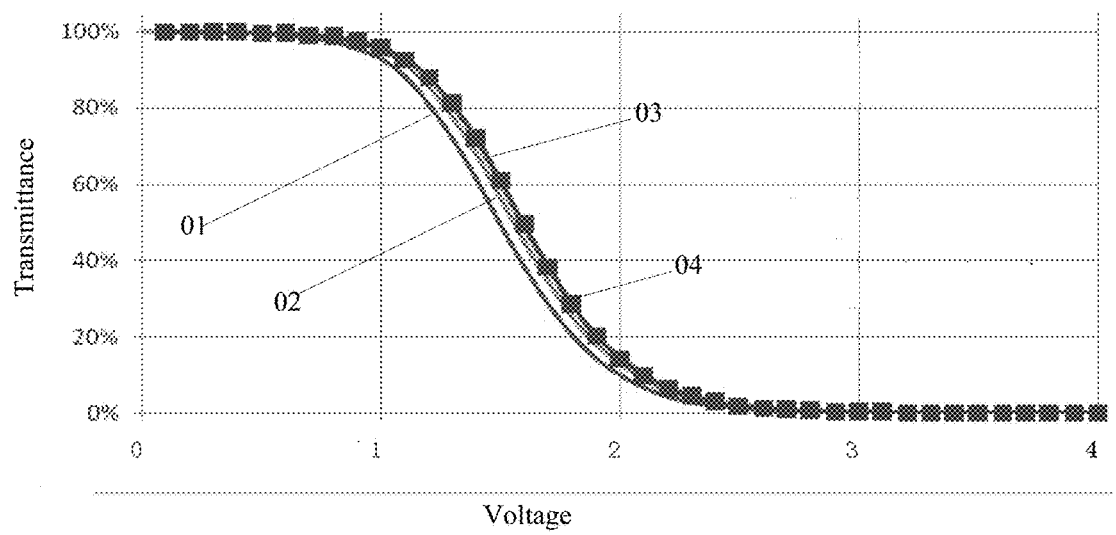
FIG. 5 is a schematic diagram showing an integral shift of the voltage-transmittance curve of the liquid crystal display panel in low temperature environment.

In a specific implementation, in the array substrate provided by the embodiment of the present invention, when normally operated in normal temperature environment (e.g., at room temperature of 298K), as can be seen from FIG. 3, the voltage difference between the both terminals of the diode D1 is −12.3 mV; therefore, the voltage difference between the both terminals of the capacitance C1 can be set as 12.3 mV. In such a manner, the integral voltage value in the route comprising the capacitance C1 and the diode D1 at normal temperature is nearly zero. In such a situation, a voltage signal inputted from the data signal receiving terminal 200 can be delivered to the input terminal of the data line 100 directly through the route comprising the diode D1 and the capacitance C1; the liquid crystal display panel thus can have a normal voltage-transmittance, ensuring the liquid crystal display panel displaying images normally. When the temperature drops to minus 20 degrees Celsius, i.e., 253K (in low temperature environment), as can be known from the curve in FIG. 3 showing a voltage difference between the both terminals of a diode changing with temperature, in this situation, the voltage difference between the both terminals of the diode D1 is about 89.6 mV, then the voltage value on the route comprising the diode D1 and the capacitance C1 is 89.6 mV+12.3 mV=101.9 mV; thus the voltage signal on the input terminal of the data line 100 can be obtained by subtracting 101.9 mV from the voltage value of the voltage signal inputted from the data signal receiving terminal 200; i.e., the actual voltage signal transmitted to the input terminal of the data line 100 is reduced by 101.9 mV, corresponding to the voltage-transmittance curve of the liquid crystal display panel in low temperature environment having an integral shift of 101.9 mV toward the direction of increasing voltage. The simulation curves are shown in FIG. 5, wherein a voltage-transmittance curve at minus 20 degrees Celsius is indicated by 01; a voltage-transmittance curve at 0 degrees Celsius is indicated by 02; a voltage-transmittance curve at 25 degrees Celsius is indicated by 03; and a voltage-transmittance curve processed by the low temperature compensation circuit 300 at minus 20 degrees Celsius is indicated by 04. As can be seen from FIG. 5, the voltage-transmittance curve of the liquid crystal display panel at minus 20 degrees Celsius is kept in accordance with that at normal temperature of 25 degrees Celsius, ensuring the output properties of the liquid crystal display panel in low temperature environment being same with those in normal temperature environment, and improving the user experience.

Based on the same inventive concept, an embodiment of the present invention further provides a display device, wherein the display device comprises the liquid crystal display panel according to the above mentioned embodiments. The display device can be any product or component with display function, such as mobile phone, tablet computer, TV, display, notebook computer, digital photo frame, navigator and so on. Since the principle of the display device for solving the problem is same with that of the array substrate, the implementation of the display device can refer to the above mentioned embodiment of the array substrate, which is not repeated herein.

The embodiments of the present invention provide an array substrate, a liquid crystal display panel and a display device. Low temperature compensation circuits one-to-one corresponding to the data lines are added to the peripheral area of the array substrate; each low temperature compensation circuit comprises a first branch and a second branch connected in parallel; wherein the first branch comprises a divider resistance; the second branch comprises a diode and a capacitance connected in series; in the second branch the position of the diode and the position of the capacitance can be interchanged, i.e., an anode terminal of the diode is connected with an input terminal of a data line, a cathode terminal of the diode is connected with a terminal of the capacitance, another terminal of the capacitance is connected with a data signal receiving terminal; or, a cathode terminal of the diode is connected with a data signal receiving terminal, an anode terminal of the diode is connected with a terminal of the capacitance, another terminal of the capacitance is connected with an input terminal of a data line. Since a diode has such a property that the voltage difference between the both terminals of the diode rises with the temperature decreasing, the voltage difference on the route comprising the diode and the capacitance rises when the temperature decreases; therefore, a divider resistance is used in the route to divide the voltage of the voltage signal inputted at the data signal receiving terminal, reducing the voltage signal inputted to the input terminal of the data line. The reduced voltage signal brings a higher transmittance, compensating the integral shift of the voltage-transmittance curve in low temperature environment. Hence, compared with the performance in normal temperature environment, by inputting the same voltage signal, the voltage-transmittance curve of the liquid crystal display panel will have an integral shift toward the direction of increasing voltage in low temperature environment, such that the voltage-transmittance curve of the liquid crystal display panel at low temperature is kept in accordance with that at normal temperature, ensuring the quality of the display image of the liquid crystal display panel in low temperature environment being same with that in normal temperature environment, and improving the user experience.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. An array substrate, wherein the array substrate comprises a display area and a peripheral area; the display area has a plurality of data lines; wherein the array substrate further comprises: low temperature compensation circuits arranged in the peripheral area and one-to-one corresponding to the data lines; each low temperature compensation circuit comprises a first branch and a second branch connected in parallel; wherein the first branch comprises a divider resistance;
the second branch comprises a diode and a capacitance connected in series;

wherein an anode terminal of the diode is connected with an input terminal of a data line, a cathode terminal of the diode is connected with a terminal of the capacitance, another terminal of the capacitance is connected with a data signal receiving terminal; or, a cathode terminal of the diode is connected with a data signal receiving terminal, an anode terminal of the diode is connected with a terminal of the capacitance, another terminal of the capacitance is connected with an input terminal of a data line.

2. The array substrate according to claim 1, wherein the sum of a voltage difference between the both terminals of the capacitance and a voltage difference between the both terminals of the diode at normal temperature is zero.

3. The array substrate according to claim 2, wherein the normal temperature is 298K-300K.

4. The array substrate according to claim 1, wherein the change rates with temperature of voltage differences between the both terminals of the diode in respective low temperature compensation circuits connected with respective data lines are the same.

5. The array substrate according to claim 4, wherein the change rate with temperature of voltage difference between the both terminals of the diode is: $\Delta V=671.5-2.3*T$; wherein T is thermodynamic temperature scale.

6. The array substrate according to claim 1, wherein a range of resistance value for the divider resistance is: 500Ω-1000Ω.

7. The array substrate according to claim 1, wherein the low temperature compensation circuit further comprises: a switching transistor connected in the second branch in series; wherein a gate of the switching transistor is connected with a control signal terminal, a source and a drain of the switching transistor are connected in the second branch in series, the control signal terminal is used for switching the switching transistor into an on state during a period of low temperature compensation.

8. A liquid crystal display panel, wherein the liquid crystal display panel comprises the array substrate according to claim 1, the liquid crystal display panel is normal white in an initial state.

9. A display device, wherein the display device comprises the liquid crystal display panel according to claim 8.

10. The liquid crystal display panel according to claim 8, wherein the sum of a voltage difference between the both terminals of the capacitance and a voltage difference between the both terminals of the diode at normal temperature is zero.

11. The liquid crystal display panel according to claim 10, wherein the normal temperature is 298K-300K.

12. The liquid crystal display panel according to claim 8, wherein the change rates with temperature of voltage differences between the both terminals of the diode in respective low temperature compensation circuits connected with respective data lines are the same.

13. The liquid crystal display panel according to claim 12, wherein the change rate with temperature of voltage difference between the both terminals of the diode is: $\Delta V=671.5-2.3*T$; wherein T is thermodynamic temperature scale.

14. The liquid crystal display panel according to claim 8, wherein a range of resistance value for the divider resistance is: 500Ω-1000Ω.

15. The liquid crystal display panel according to claim 8, wherein the low temperature compensation circuit further comprises: a switching transistor connected in the second branch in series; wherein a gate of the switching transistor is connected with a control signal terminal, a source and a drain of the switching transistor are connected in the second branch in series, the control signal terminal is used for switching the switching transistor into an on state during a period of low temperature compensation.

* * * * *